Oct. 27, 1925.
T. BRIGHOUSE
1,558,587
LIQUID SEALED GLAND FOR ROTATING SHAFTS
Filed Jan. 2, 1919
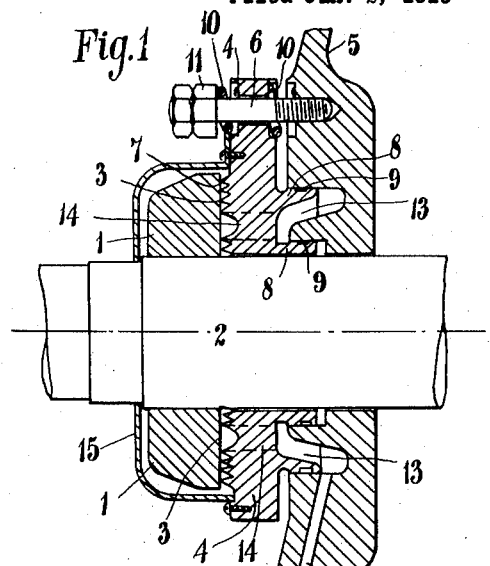
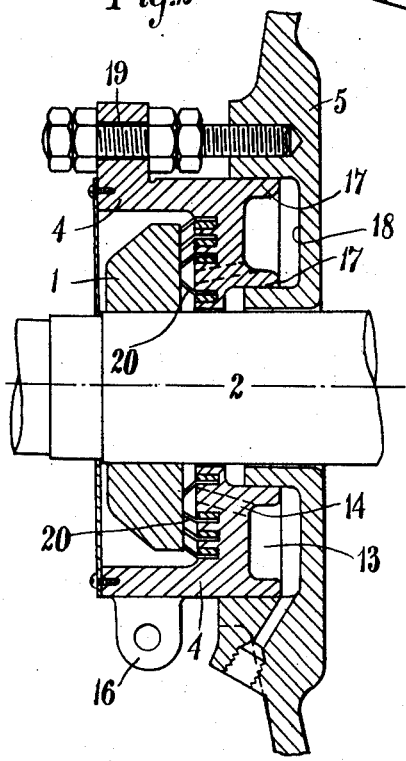
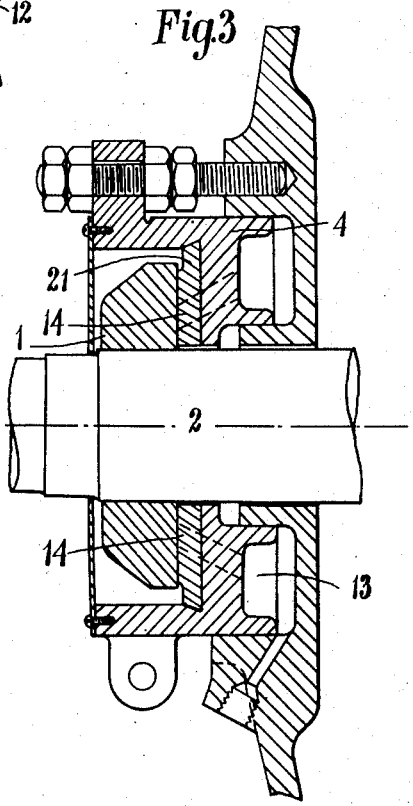
INVENTOR Patented Oct. 27, 1925.

1,558,587

UNITED STATES PATENT OFFICE

THOMAS BRIGHOUSE, OF STRETFORD, ENGLAND, ASSIGNOR, BY MESNE ASSIGNMENTS, TO WESTINGHOUSE ELECTRIC AND MANUFACTURING COMPANY, A CORPORATION OF PENNSYLVANIA.

LIQUID-SEALED GLAND FOR ROTATING SHAFTS.

Application filed January 2, 1919. Serial No. 269,384.

*To all whom it may concern:*

Be it known that I, THOMAS BRIGHOUSE, a subject of the King of Great Britain, and a resident of Stretford, in the county of Lancaster, England, have invented a new and useful Improvement in Liquid-Sealed Glands for Rotating Shafts, of which the following is a specification.

This invention relates to liquid sealed glands for rotating shafts and, although not limited in this respect, especially for the shafts of rotary air and vacuum pumps.

When glands of the stuffing box type are employed with rotating shafts considerable wear on the shaft takes place especially where the soft packing of the gland presses on the shaft, this wear resulting in leakage through the glands which necessitates their being frequently tightened and also shortens the life of the shaft.

Attempts have been made to overcome these difficulties by fitting removable bushes on the shaft where it passes through the gland. In this way the life of the shaft is prolonged but the difficulty of wear and the consequent necessity for frequent adjustment of the gland packing to prevent leakage is not surmounted.

The present invention has for its object to provide an improved liquid sealed gland for rotating shafts in which the above difficulties are overcome.

According to this invention the gland comprises a flange or collar fast on the rotating shaft, having a radial contact face with which another contact face, formed on the casing of the machine through which the shaft passes, or preferably on a member connected therewith, co-operates. A suitable sealing liquid, water for example, is introduced between said co-operating faces, through ports and passages in the casing of the machine or the member connected therewith.

In order that the nature of the invention may be clearly understood it will now be described with reference to the accompanying drawings which illustrate three different ways of carrying out the same in practice.

Fig. 1 is a view, the upper portion being a horizontal central section and the lower portion being a vertical central section of a shaft provided with a liquid sealed gland in accordance with the invention. Figs. 2 and 3 are views similar to Fig. 1 illustrating two other embodiments of the invention.

Referring now to Fig. 1, a flange or collar 1 preferably made in halves so as to be easily removable is mounted with a driving fit on the shaft 2 and is provided with a radial face 3 which is preferably hardened to withstand wear. A bush 4 of brass or other suitable metal is connected with the casing 5 of the machine through which the shaft 2 passes by means of set pins, one of which is shewn at 6. The bush is preferably made in two halves with a horizontal joint passing through the holes through which the set pins 6 are passed and is provided with a face adapted to cooperate with the face of the flange 1 and this face may be serrated as indicated at 7 in order to reduce friction or provided with white metal wearing segments for this purpose. The face of this bush forms the contact face of the casing of the machine.

To take care of end play in the shaft and insure the co-operating faces of the flange 1 and bush 4 being always maintained in proper relative position, the bush is furnished with one or more pistons 8, two such pistons being shown in the drawing, adapted to slide in a shallow cylindrical opening or cylindrical openings 9 formed in the machine casing 5 and springs 10 are inserted between the machine casing and the bush 4 on the one hand, and between the bush and the nuts 11 of the set pins on the other hand. A sealing liquid inlet 12 in the machine casing communicates with a chamber 13 in the bush 4 from which chamber ports 14 lead to the contact face of the bush. Preferably the areas of the contact face and of the liquid chamber in the bush are so proportioned that the pressure of the sealing liquid on either side of the bush will be substantially equal. A cover 15 surrounding the flange 1 is attached to the bush 4 in order to prevent the sealing liquid being thrown out.

In operation the sealing liquid which is supplied through the inlet 12 and chamber 13 and ports 14 in the bush 4 will on reaching the contact faces of the flange and of the bush be thrown outwards towards the periphery of the gland and provide an effective seal between the shaft 2 and the casing 5 of the machine. Preferably the positions of the flange 1 and bush 4 are so adjusted that there is normally a small clearance between these parts, contact only taking place between them when end movement of the shaft occurs.

In Fig. 2 the bush 4 is formed in two parts having a vertical joint between them, said parts being connected together by bolts passing through lugs one of which is shown at 16 in the drawing and is provided with an annular flange 17 which engages by a press fit in a correspondingly formed recess 18 in the casing 5 of the machine. The parts of the bush are furthermore firmly secured to the casing by bolts one of which is indicated at 19 and in this instance of course no springs are provided. The contact face of the bush 4 is furnished with resilient packing strips or rings 20, copper leaves for example, which will permit end movement of the shaft to take place, said strips or leaves may be secured to the flange 1 instead of to the bush 4 if desired.

In those cases in which in order to eliminate end movement the rotating shaft is connected by a flexible coupling with another driving or driven shaft the gland may be constructed to act also as a thrust bearing. This is illustrated in Fig. 3 of the drawings in which the stationary contact face of the bush 4 is provided with friction or thrust blocks 21, the sealing liquid being introduced through the ports 14 to the contact faces of said blocks and the contact face of the flange 1 on the shaft. The construction is otherwise similar to that shown in Fig. 2.

From the foregoing it will be readily appreciated that with the improved gland of this invention the use of a soft packing is dispensed with, any adjustments may be made while the shaft is running and the life of the shaft is considerably prolonged as compared with that of the shaft where glands of the stuffing box type heretofore employed have been used. The improved gland furthermore has a very desirable feature, namely that it is extremely accessible and the parts can be readily removed and displaced without eliminating the machine.

I claim as my invention:

1. The combination with a casing element and a shaft, of a gland comprising a collar fixed to the shaft and a bush element contiguous to the collar to provide therewith radially opposed surfaces having a close clearance therebetween, adjustable means for regulating the extent of clearance between the opposed surfaces of said collar and said bush element, male and female centering elements provided in the bush element and the casing element respectively, and means for supplying an extraneous sealing liquid between the contiguous surfaces of the collar and the bush element.

2. The combination with a casing element and a shaft, of a gland arranged externally of the casing element and comprising a collar fixed to the shaft and a bush element contiguous to the collar to provide therewith radially opposed surfaces having a close clearance therebetween, a cylinder provided in the casing element, a piston secured to the bush element and movable within the cylinder, and resilient adjustable means for regulating the extent of clearance between the opposed surfaces of said collar and said bush element and for yielding upon contact of the said surfaces, one with the other, whereby wear of the surfaces due to temporary axial movements of the shaft is minimized.

3. The combination with a casing element and a shaft, of a gland arranged externally of the casing element and comprising a collar fixed to the shaft and a bush element contiguous to the collar to provide therewith radially opposed surfaces having a close clearance therebetween, resilient adjustable means for regulating the extent of clearance between the opposed surfaces of said collar and said bush element and for yielding upon contact of the said surfaces, one with the other, whereby wear of the surfaces due to temporary axial movements of the shaft is minimized, a cylinder provided in the casing element co-axial with the shaft, a piston secured to the bush element and slidably disposed within the cylinder, and means for supplying an extraneous sealing liquid between the contiguous surfaces of the collar and the bush element.

4. The combination with a casing element and a shaft element, of a gland comprising a collar fixed to the shaft element and a bush element carried by the casing element contiguous to the collar to provide radially opposed surfaces, piston and cylinder means co-axial with the shaft element and located between the bush element and the casing element, means for supplying an extraneous sealing fluid to the piston and cylinder means and between the contiguous surfaces of the collar and bush element, and a cover carried by the bush element to prevent leakage of said fluid.

5. The combination with a casing element and a shaft element, of a gland comprising a collar fixed to the shaft element and a bush element contiguous thereto to provide radially opposed surfaces, concentric pistons provided on the bush element, concentric cylinders cooperating therewith provided on the casing element, resilient means supported by the casing element and cooperating with the bush element to maintain the latter in position, and cover means for the collar carried by the bush element.

6. The combination with a casing element and a shaft element, of a gland comprising a collar fixed to the shaft element and a bush element contiguous to the collar to provide radially opposed surfaces, adjustable means supported by the casing element and cooperating with the bush element to maintain the latter in position, inner and outer piston and cylinder joints provided between the bush element and the casing element, a cover for the collar carried by the bush element and means for supplying an extraneous sealing fluid between the contiguous surfaces.

In testimony whereof I have hereunto subscribed my name this fourteenth day of October, 1918.

THOMAS BRIGHOUSE.